United States Patent
Fontes

(10) Patent No.: US 9,166,645 B2
(45) Date of Patent: *Oct. 20, 2015

(54) COOPERATIVE MANAGEMENT OF BUSINESS DEVICES

(71) Applicant: Verizon Patent and Licensing Inc., Basking Ridge, NJ (US)

(72) Inventor: Mark S. Fontes, Cary, NC (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/181,837

(22) Filed: Feb. 17, 2014

(65) Prior Publication Data

US 2014/0162725 A1    Jun. 12, 2014

Related U.S. Application Data

(63) Continuation of application No. 13/441,259, filed on Apr. 6, 2012, now Pat. No. 8,655,407.

(51) Int. Cl.
    *H04B 1/38*     (2006.01)
    *H04B 1/3816*   (2015.01)
    *H04L 12/26*    (2006.01)
    *H04W 4/00*     (2009.01)

(52) U.S. Cl.
    CPC ............ *H04B 1/3816* (2013.01); *H04L 43/065* (2013.01); *H04L 43/08* (2013.01); *H04W 4/006* (2013.01)

(58) Field of Classification Search
    CPC .... H04B 1/3816; H04L 43/065; H04L 43/08; H04W 4/006
    USPC ......................................................... 455/557
    See application file for complete search history.

(56) References Cited

U.S. PATENT DOCUMENTS

| | | | |
|---|---|---|---|
| 8,655,407 B2 * | 2/2014 | Fontes ........................... | 455/557 |
| 2006/0106490 A1 * | 5/2006 | Howell et al. .................. | 700/233 |
| 2010/0138037 A1 * | 6/2010 | Adelberg et al. ............. | 700/241 |
| 2010/0191370 A1 * | 7/2010 | Barragan Trevino et al. | 700/244 |
| 2012/0245979 A1 * | 9/2012 | Murray et al. ............... | 705/7.36 |
| 2012/0311149 A1 | 12/2012 | Trevino et al. | |

* cited by examiner

*Primary Examiner* — Barry Taylor

(57) ABSTRACT

A method includes receive network information for a network at an intelligent cellular router modem associated with a business device. The method also includes compressing the network information. Business device information associated with the business device is received. The business device information is also compressed. The method includes sending the compressed business device information and network information to the intelligent management host device via the network. The method also includes determining whether a response based on the compressed business device information and network information is received within a predetermined response time. An action is determined based on a received response in response to a determination that the response has been received. An action is also determined based on absence of a received response in response to a determination that the response has not been received.

20 Claims, 8 Drawing Sheets

| BUSINESS METRIC 312 | FIRST BMV 314 | SECOND BMV 316 |
|---|---|---|
| MACHINE TEMPERATURE 1 | 047 | 062 |
| MACHINE TEMPERATURE 2 | 047 | 062 |
| SLOT 1 | 000 | 000 |
| SLOT 2 | 005 | 005 |
| SLOT 3 | 010 | 010 |
| CHANGE AVAILABLE | 020 | 020 |
| DOLLARS RECEIVED | 080 | 080 |
| DOLLARS REJECTED | 129 | 129 |
| UNUSED FIELD | 999 | 999 |
| UNUSED FIELD | 999 | 999 |

FIG. 3B

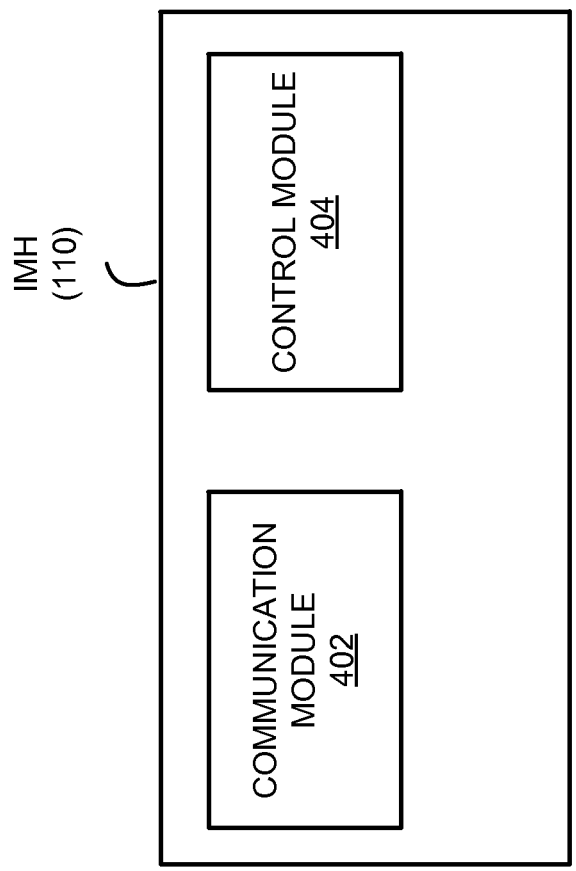

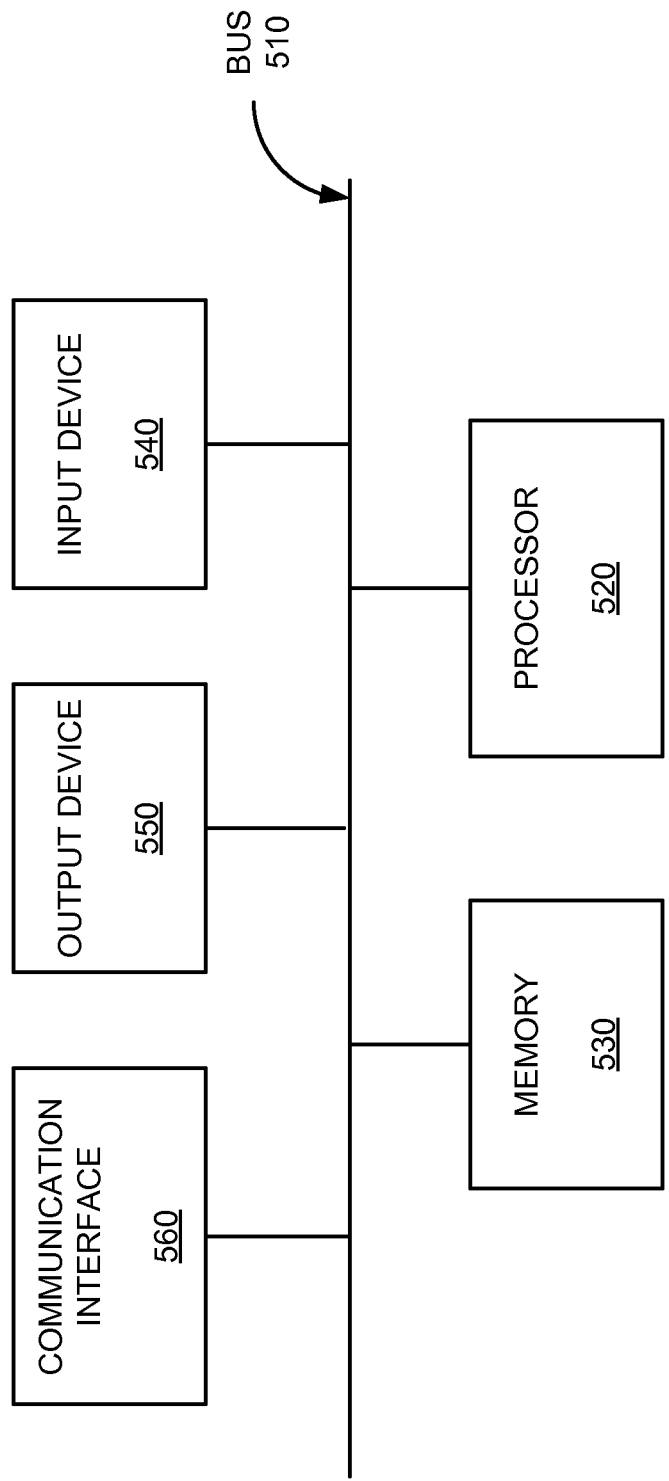

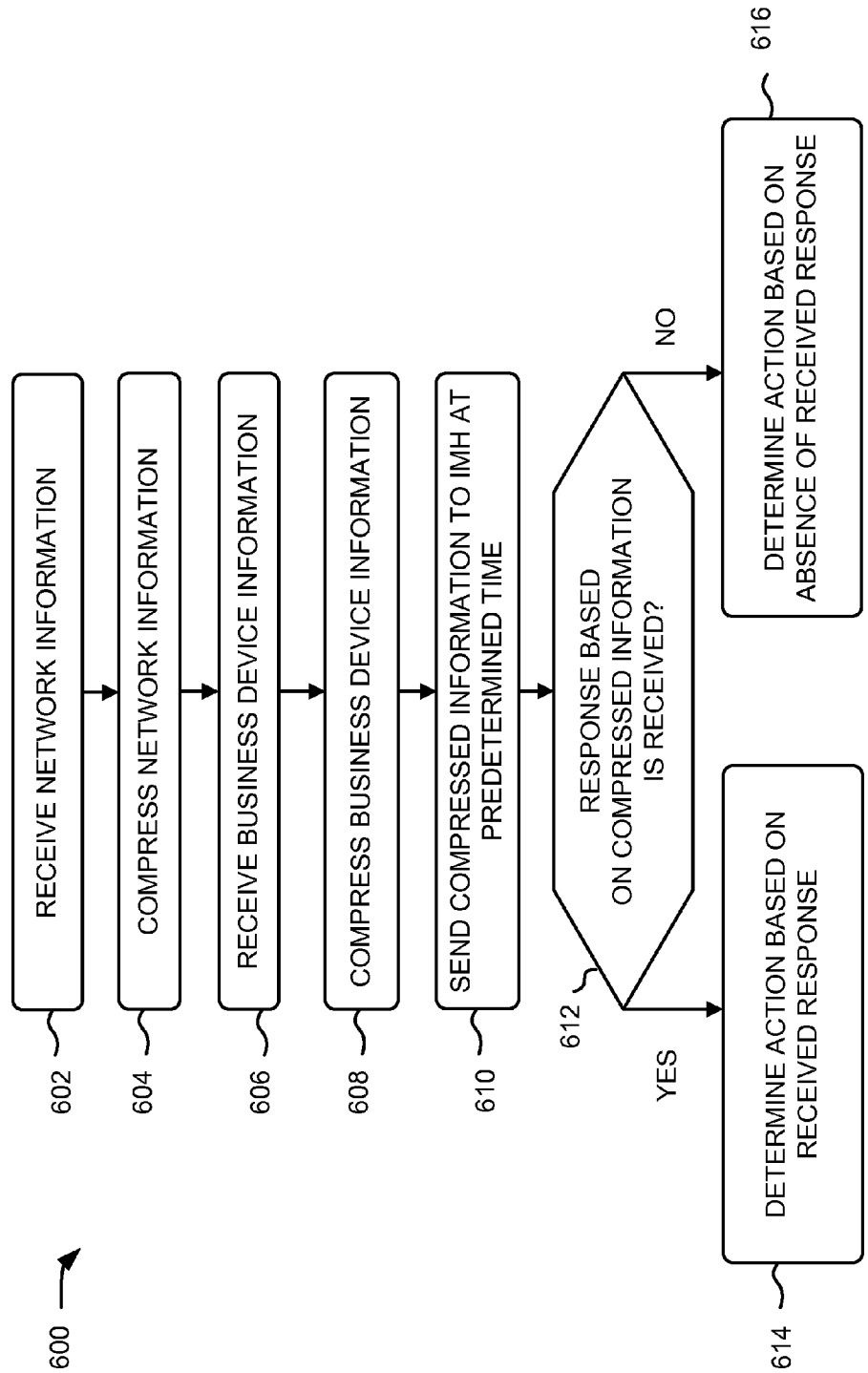

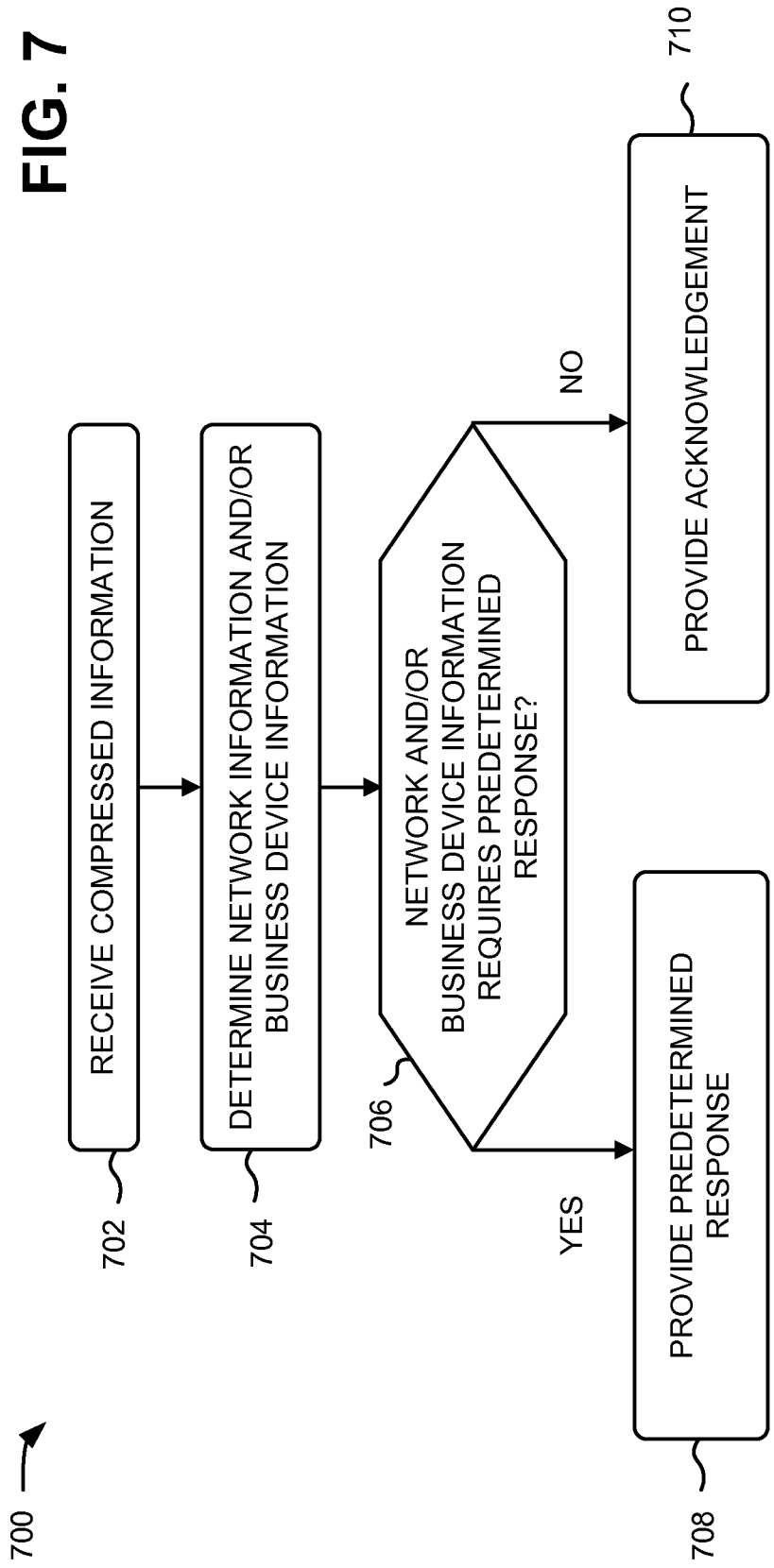

COOPERATIVE MANAGEMENT OF BUSINESS DEVICES

CROSS REFERENCE TO RELATED APPLICATIONS

This application is a continuation of U.S. patent application Ser. No. 13/441,259 filed on Apr. 6, 2012, the disclosure of which is incorporated herein by reference in its entirety.

BACKGROUND

Devices in a network may be monitored using different status updating schemes, which may include polling schemes, such as simple network management protocol (SNMP). The devices may be monitored, based on predefined metrics for the network and/or the device, such as network signal strength, available bandwidth, etc., for network conditions that require administrative attention.

BRIEF DESCRIPTION OF THE DRAWINGS

FIG. 3B is an exemplary business device information table;

FIG. 4 is a diagram of exemplary functional components of an intelligent management host (IMH);

FIG. 5 is a block diagram of exemplary components of a device that may correspond to one of the devices of FIG. 1, 2 or 4;

FIG. 6 is a flow chart of an exemplary process to provide network information and business device information according to an implementation described herein; and FIG. 7 is a flow chart of an exemplary process for managing an ICRM and associated business device according to an implementation described herein.

DETAILED DESCRIPTION

The following detailed description refers to the accompanying drawings. The same reference numbers in different drawings may identify the same or similar elements. Also, the following detailed description is exemplary and explanatory only and is not restrictive of the invention, as claimed.

Systems and/or methods described herein may provide cooperative management of one or more business devices based on communication between cellular router-modems associated with the business devices and an intelligent management hosting device. The cellular router-modems may compile and compress network information and business device information. The cellular router-modems may send the compressed information to the intelligent management hosting device. The intelligent management hosting device may decompress the compressed information and provide instructions for the cellular router-modems based on the network information and the business device information.

Consistent with the embodiments described herein, management of customer networks connected by cellular transport devices may be simplified when compared to status updating methods that include intermediary devices. For example, when compared to polling of devices in an SNMP network, the method may allow for a substantially reduced number of polling/networking devices and flexible status updating of business devices while increasing the amount and the flexibility of business related information made available from the business devices.

Figure 1:
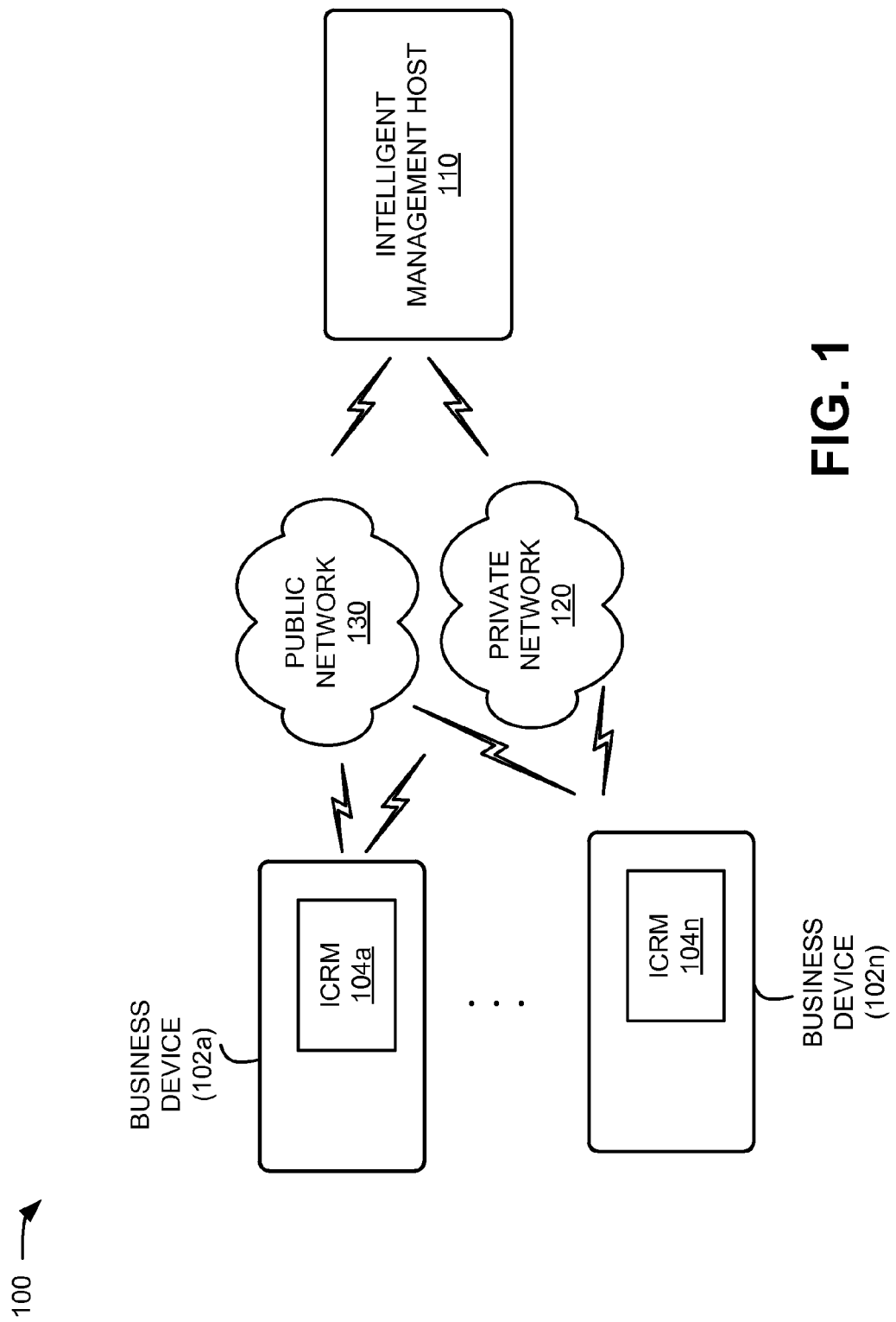
FIG. 1 is an exemplary network in which systems and/or methods described herein may be implemented.

FIG. 1 is an exemplary network 100 in which systems and/or methods described herein may be implemented. As illustrated, network 100 may include a plurality of business devices 102a-102n (respectively business device 102a, and 102n, collectively referred to as business devices 102 or individually as business device 102), which include corresponding intelligent cellular router-modems (ICRMs) 104a-104n (respectively ICRM 104a, and ICRM 104n, collectively referred to as ICRMs 104 or individually as ICRM 104), an intelligent management host (IMH) 110, a private network 120, and a public network 130. The particular arrangement and number of components of network 100 shown in FIG. 1 are illustrated for simplicity. In practice there may be more business devices 102, ICRMs 104, IMHs 110, and/or networks 120/130. Components of network 100 may be connected via wired and/or wireless links.

Business devices 102 may perform one or more primary functions related to a principal business purpose ("core business") of an internal or external customer of a particular business. For example, business devices 102 may include automated teller machines (ATMs) in a banking system. In another example, business devices 102 may include sales oriented machines, such as soda machines, candy machines, multimedia dispensing machines, point of sales devices, etc., in a sales organization. In any event, business devices 102 may have associated business metrics (e.g., an item inventory, environmental conditions, etc.) and values that identify business related information and enable administrators to monitor performance of business devices 102 and determine capabilities of business devices 102 to fulfill functions associated with the primary business purpose. For example, a soda machine may have a power status (i.e., whether the soda machine is receiving power), an associated temperature, a soda inventory (including how many sodas have been sold, of each type, etc.), a cash and coin inventory, and other business metrics that indicate the capability of the machine to fulfill the principal business purpose (i.e., providing sodas at a particular temperature in exchange for particular sums of money). Each business device 102 may include an ICRM 104 that collects and compiles data from business device 102.

ICRM 104 may compile and compress network information and business device information. The network information may include information regarding the operating conditions of networks that may be used to transport information from ICRM 104 to IMH 110. The network information may be compiled as described with respect to FIG. 3A and network information table 300 below. The business device information includes information regarding/associated with business device 102 and may be compiled and compressed as described with respect to FIG. 3B and business device information table 320 below. ICRM 104 may also encrypt data and send the compressed information to IMH 110.

ICRM 104 may send compressed information, including the network information and the business device information, via private network 120 and/or public network 130 to IMH 110 at a hub or central repository for a business (e.g., at a bank's computing head office).

IMH 110 may provide support and control of business devices 102 via ICRMs 104. IMH 110 may receive compressed information, including the network information and the business device information, from ICRMs 104. IMH 110 may decompress the compressed information and determine a response based on the network information and/or the business device information as described below with respect to process 700 and FIG. 7.

Private network 120 may include, for example, one or more private IP networks that use a private Internet protocol (IP) address space. Private network 120 may include a local area network (LAN), an intranet, a private wide area network (WAN), etc. In one implementation, private network 120 may implement one or more Virtual Private Networks (VPNs) for providing communication between, for example, any of business devices 102, ICRMs 104, and IMH 110. Private network 120 may be protected/separated from other networks, such as public network 130, by a firewall. Although shown as a single element in FIG. 1, private network 120 may include a number of separate networks.

Public network 130 may include a local area network (LAN), a wide area network (WAN), such as a cellular network, a satellite network, a fiber optic network, a private WAN, or a combination of the Internet and a private WAN, etc. that is used to transport data. Although shown as a single element in FIG. 1, public network 130 may include a number of separate networks that function to provide communication between business devices 102, ICRMs 104, and/or IMH 110.

In implementations described herein, cooperative management (between ICRMs 104 and IMH 110) of one or more business devices 102 may be implemented based on communication between ICRMs 104 associated with business devices 102 and IMH 110. ICRMs 104 may collect network information and business device information and provide predetermined responses to particular detected conditions in networks 120/130 and business device 102. IMH 110 may allow additional control of ICRMs 104 and associated business devices 114. Cooperative management may be used to simplify management of customer networks connected via cellular networks.

Figure 2:
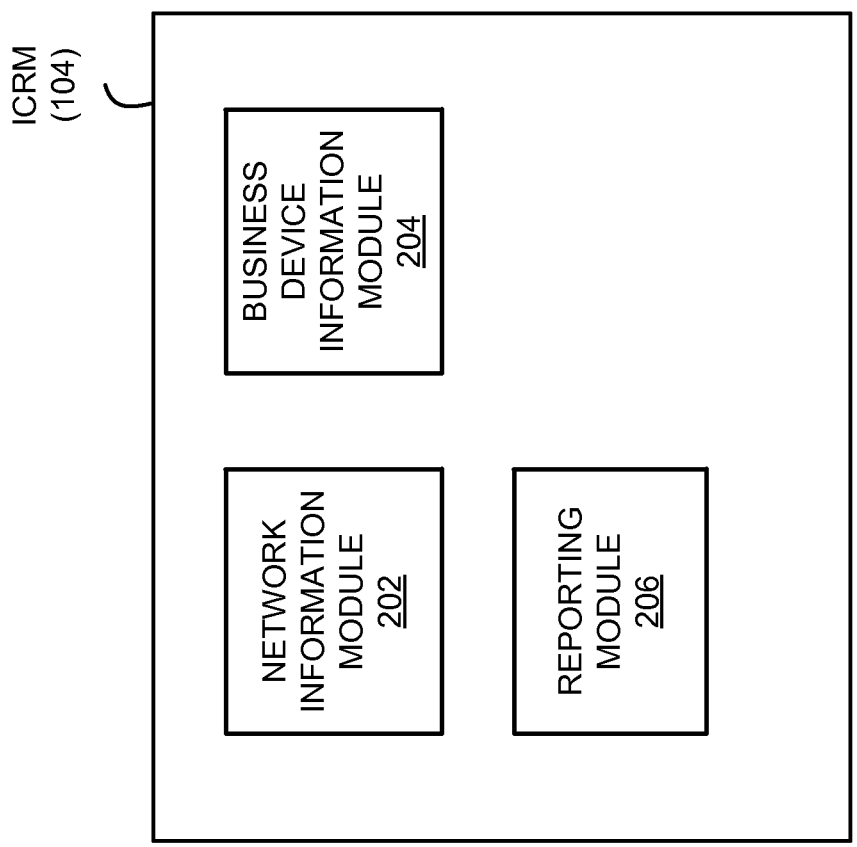
FIG. 2 is a diagram of exemplary functional components of an intelligent cellular router-modem (ICRM)

FIG. 2 is a diagram of an exemplary ICRM 104. ICRM 104 may comprise machine-readable instructions, hardware, or a combination of hardware and machine-readable instructions. ICRM 104 may include a network information module 202, a business device module 204, and a reporting module 206. According to an embodiment, ICRM 104 may be a component of a business device, such as business device 102 as described with respect to FIG. 1 above. Alternatively, ICRM 104 may be implemented as a separate device that is operably connected to business device 102 (e.g., ICRM 104 may be connected to business device 102 via a wireless or wired connection). The configuration of components of ICRM 104 illustrated in FIG. 2 is for illustrative purposes only. Other configurations may be implemented. Therefore, ICRM 104 may include additional, fewer and/or different components than those depicted in FIG. 2.

ICRM 104 may implement management and control of business devices 102 in conjunction with IMH 110. ICRM 104 may compress, encode and transmit (e.g., via networks 120/130) network information and business device information to IMH 110 using network information module 202, business device information module 204, and reporting module 206.

Network information module 202 may enable identification of network conditions, for example in network 120 and/or network 130, by collecting and compiling network information, such as information included in table 300 and described with respect to FIG. 3A below. The network information may include allocated bandwidth for communications between ICRM 104 and IMH 110, signal strength, etc.

Business device information module 204 may enable identification of business device information, including business metrics associated with particular business devices 102, such as business metrics included in table 310 and described with respect to FIG. 3B below. For example, the business device information may include business metrics relevant to each particular business selected by an administrator for a cooperative management system that includes ICRMs 104 and IMH 110. In a particular example, a soda vending company may extract particular information from soda machines (i.e., business machines 102 for the soda company), such as temperature, soda inventory, etc., and transfer the reported business device information to reporting module 206.

According to one implementation, business device information module 204 may determine whether the business device information includes values for business metrics that exceed a predetermined threshold. Business device information module 204 may issue event codes in response to a determination that the business device information includes values for business metrics that exceed a predetermined threshold. Business device information module 204 may generate event codes and issue the event codes to devices associated with particular entities in response to particular events associated with business devices 102. For example, the event codes may alert the administrator of IMH 110 (via an associated device) with regard to the occurrence of particular events associated with business devices 102. Business device information module 204 may generate and transmit the event codes at scheduled instances or initiate actions in immediate response to the detection of the particular events. Business device information module 204 may also transmit alerts to additional predetermined parties, such as devices associated with security, support, or service personnel.

According to one embodiment, the event code may indicate that an associated motion sensor has detected that the business device 102 is being shaken. Business device information module 204 may issue an event code that alerts administrators and/or triggers an alarm in response to detected motion that exceed a predetermined threshold. For example, if business device 102 is an ATM, the event code may trigger a "device shaking" alarm if the ATM experiences a major "shock" (e.g. the ATM has been hit with a sledge hammer). Additional event codes may indicate penetration of the ATM and trigger the taking of multiple pictures (e.g., by one or more associated cameras) that may be sent to IMH 110 via networks 120/130. Another event code may indicate that power supply to business device 102 has stopped but ICRM 104 is still functional (e.g., in an instance in which is ICRM 104 has an associated independent power source, such as a battery) and communication via network 100 is operational. Further event codes may indicate that a change in environment detected by an environmental sensor associated with ICRM 104 exceeds a predetermined threshold (e.g., temperature or humidity exceeding particular thresholds for a food vending machine).

Reporting module 206 may receive network information from networking module 202 and business device information from business device module 204. Reporting module 206 may compile and compress network information, as described with respect to FIG. 3A and table 300, and network information, as described with respect to FIG. 3B and table 310. ICRM 104 may include an internal timer that tracks predetermined status update intervals (i.e., reporting intervals) at which ICRM 104 is to provide reports including business information and network information.

Reporting module 206 may compress the business device information and the network information based on a compression key that is available to both ICRMs 104 and IMH 110. The compression key may indicate a format for compressing and decompressing data that reduces a size of data that may be transmitted between ICRMs 104 and IMH 110. For example, the compression key may indicate an operative status of a LAN interface as ILO (Interface LAN OK), and an operative status of a cellular interface as ICO (Interface Cellular OK). The compression key may also indicate that business device 104 has detected a temperature with a particular range (e.g., T1 may be a detected temperature between 67-80 degrees and T2 may be a detected temperature between 85-90 degrees, etc.). The compression key may also indicate that business device 104 has detected humidity with a particular range (e.g., H1 may be a detected humidity between 20-70%, etc.). Further data may be compressed based on ranges of values and threshold values (e.g., values selected by an administrator) for metrics measured in association with business device 102.

According to one implementation, whenever ICRM 104 connects to networks 120/130, reporting module 206 may send a very short "prepare for transmission" message to IMH 110. For example, if the predetermined status update interval is set to 6 minutes then, when the timer associated with ICRM 104 reaches within a predetermined time from the predetermined status update interval (e.g., 5 minutes), ICRM 104 may send an "I am OK" status message to IMH 110 in instances in which ICRM 104 is connected to networks 120/130. Reporting module 206 may aggregate and send the information at periodic intervals (e.g. once a day, every two hours, etc.) based on predetermined status update intervals selected by administrators at which business variables for each business device 102 are to be monitored.

Reporting module 206 may allow a reduction in an amount of data that is sent between business devices 104 and IMH 110. Reporting module 206 may allow an administrator to substantially reduce the number of connections required for network management while preserving the transfer of timely pertinent information. For example, an administrator for a candy machine (i.e., a particular business device 102) may reduce the number of status updates by increasing a length of the predetermined status update interval from 6 minutes to hourly with the exception of times that the candy machine exceeds predetermined temperature or other thresholds. Reporting module 206 may also reduce a time of connectivity required for status update intervals when compared to other status update schemes, such as SNMP. Reporting module 206 may send compressed information that is business purpose specific and excludes information that is extraneous to the business purpose or a determination of network conditions.

Figure 3A:
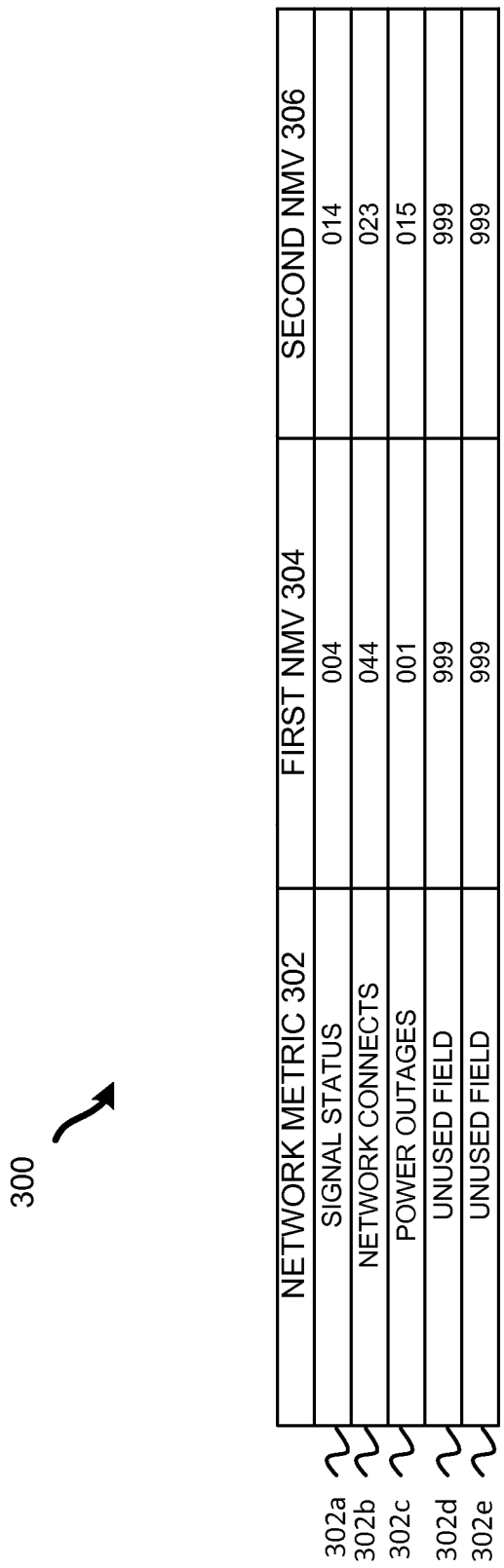
FIG. 3A is an exemplary network information table.

FIG. 3A is an exemplary network information table 300. As shown in FIG. 3A, table 300 includes network metrics 302a-302e (respectively network metric 302a, network metric 302b, network metric 302c, network metric 302d, and network metric 302e, collectively referred to as network metrics 302 or individually as network metric 302) that have corresponding first network metric values (NMVs) 304 and second NMVs 306. The configuration of entries in table 300 illustrated in FIG. 3A is for illustrative purposes only. Other configurations may be implemented. Therefore, table 300 may include additional, fewer and/or different entries than those depicted in FIG. 3A.

As shown in FIG. 3A, table 300 includes network metrics 302 that may identify (or may be used to identify) network conditions in networks 120/130. Network metric 302a is a network signal status and corresponds to a signal level (first NMV 304 corresponding row, which is 4 in table 300) and a number of failed connections (second NMV 306 corresponding row, which is 14). Network metric 302b is network connects and corresponds to a total number of minutes that ICRM 104 has connected in a particular period of time (e.g., a day, a week, etc.) (first NMV 304 corresponding row, which is 44) and a total number of times connected in a particular period of time (second NMV 306 corresponding row, which is 23). Network metric 302c is power outages and corresponds to a total number of outages (of networks 120/130) for a particular period of time (first NMV 304 corresponding row, which is 1) and a total outage minutes for a particular period of time (second NMV 306 corresponding row, which is 15). Table 300 includes network metrics 302d and 302e which are unused fields with 999 indicating a null value for first NMVs 304 and second NMVs 306. An administrator (or system user with administrative privileges) may add additional network metrics 302 to table 300 based on particular requirements.

According to one implementation, table 300 may include values corresponding to business metrics associated with the business device and values corresponding to network metrics associated with the network arranged in a particular order. The particular order may indicate that a particular value corresponds to a particular metric. Table 300 may be transmitted with NMVs (i.e., first NMVs 304 and second NMVs 306) arranged in the particular order that identifies a corresponding network metric for the NMV. The NMVs may be the only data that is transmitted between ICRM 104 and IMH 110. For example, the first three fields may be assigned to a first NMV 304 of network metric 302a, the next three fields may be assigned for the second NMV 306 of network metric 302a, and following fields may provide first NMVs 304 and second NMVs 306 for additional network metrics 302, such as signal status, etc. The network information from table 300 may be transmitted in a packet that includes an appropriate header followed by 004014044023001015, which contains values corresponding to the first NMVs 304 and second NMVs 306 for signal status, network connects, and power outages in a particular order (in this instance a consecutive sequence).

FIG. 3B is an exemplary business device information table 310. As shown in FIG. 3B, table 310 includes business metrics 312a-312j (respectively business metric 312a, business metric 312b, business metric 312c, business metric 312d, business metric 312e, business metric 312f, business metric 312g, business metric 312h, business metric 312i, and business metric 312j, collectively referred to as business metrics 312 or individually as business metric 312) that have corresponding first business metric values (BMVs) 314 and second BMVs 316. The configuration of entries in table 310 illustrated in FIG. 3B is for illustrative purposes only. Other configurations may be implemented. Therefore, table 310 may include additional, fewer and/or different entries than those depicted in FIG. 3B.

As shown in FIG. 3B, table 310 includes business metrics 312 that may identify (or may be used to identify) performance, conditions, or values associated with business device 102. In this instance the particular business may be a food vending service and the product may be preferably kept within a particular temperature range in the vending machine. Business metric 312a is a machine temperature 1, which may be a temperature of a particular section of the vending machine and corresponds to a weekly range of detected temperatures (first BMV 314, which is 47 and may be a low boundary of the range of temperatures detected, and second BMV 316, which is 62 and may be a high boundary of the range of temperatures detected). Additional entries in table 310 include business metrics 312 based on different machine temperatures (e.g., business metric 312b, machine temperature 2), and number of items in slots 1, 2, and 3 (business metrics 312c, 312d, 312e, which includes corresponding numbers of items currently located in each slot (first BMV 314)/and a number of items sold today (second BMV 316)). Table 310 also includes amount of change available (Nickels (first BMV 314)/Quarters (second BMV 316)) as well as dollars (e.g., dollar bills) received (dollars received today (first BMV 314)/dollars received since last time the machine was restocked (second BMV 316)) and dollars rejected (today (first BMV 314)/since last time the machine was restocked (second BMV 316)) (i.e., dollars fed into reader and failed). Table 310 also includes unused fields for business metrics 312i and 312j with 999 indicating a null value for first BMVs 314 and second BMVs 316 (and therefore available for administrator modification).

The business device information may be compiled for transmission in a similar manner as described with respect to table 300 and network information above. According to one implementation, business device 102 may have daily registers that return to zero values for particular business metrics 312 in table 310 (e.g., dollars received, dollars rejected, etc.) at midnight local, weekly registers, return to zero values on each Friday night at midnight, and monthly registers that zero at the end of the month at midnight. Compilation of particular business metrics 312 may restart after the registers are zeroed.

FIG. 4 is a diagram of an exemplary IMH 110. IMH 110 may comprise machine-readable instructions, hardware, or a combination of hardware and machine-readable instructions. IMH 110 may include a communication module 402, and a control module 404. The configuration of components of IMH 110 illustrated in FIG. 4 is for illustrative purposes only. Other configurations may be implemented. Therefore, IMH 110 may include additional, fewer and/or different components than those depicted in FIG. 4.

As shown in FIG. 4, communication module 402 may receive compressed information from ICRMs 104. Communication module 402 may decompress the compressed information based on the compression key to determine network information and business device information for business devices 102 associated with particular ICRMs 104. For example, communication module 402 may associate data received from ICRMs 104 with particular network metrics 302 or business metrics 312 as described with respect to FIGS. 3A, and 3B, and tables 300, and 310, respectively.

Control module 404 may determine a response based on the received network information and/or business device information. For example, control module 404 may implement automatic procedures via ICRMs 104 in response to detected conditions or events. Alternatively, control module 404 may issue alerts to devices associated with administrative personnel for the particular business system (e.g., a message that indicates a particular business device 102 is overheating, or that change may soon be needed for a vending machine (business device 102)).

FIG. 5 is a diagram of exemplary components of a device 500 that may correspond to business device 102, ICRM 104, or IMH 110. Each of business device 102, ICRM 104, or IMH 110 may include one or more devices 500. As shown in FIG. 5, device 500 may include a bus 510, a processor 520, a memory 530, an input device 540, an output device 550, and a communication interface 560.

Bus 510 may permit communication among the components of device 500. Processor 520 may include one or more processors or microprocessors that interpret and execute instructions. In other implementations, processor 520 may be implemented as or include one or more application specific integrated circuits (ASICs), field programmable gate arrays (FPGAs), or the like.

Memory 530 may include a random access memory (RAM) or another type of dynamic storage device that stores information and instructions for execution by processor 520, a read only memory (ROM) or another type of static storage device that stores static information and instructions for the processor 520, and/or some other type of magnetic or optical recording medium and its corresponding drive for storing information and/or instructions.

Input device 540 may include a device that permits an operator to input information to device 500, such as a keyboard, a keypad, a mouse, a pen, a microphone, one or more biometric mechanisms, and the like. Output device 550 may include a device that outputs information to the operator, such as a display, a speaker, etc.

Communication interface 560 may include any transceiver-like mechanism that enables device 500 to communicate with other devices and/or systems. For example, communication interface 560 may include mechanisms for communicating with other devices, such as other devices of network 100.

As described herein, device 500 may perform certain operations in response to processor 520 executing machine-readable instructions contained in a computer-readable medium, such as memory 530. A computer-readable medium may include a non-transitory memory device. A memory device may include space within a single physical memory device or spread across multiple physical memory devices. The machine-readable instructions may be read into memory 530 from another computer-readable medium or from another device via communication interface 550. The machine-readable instructions contained in memory 530 may cause processor 520 to perform processes described herein. Alternatively, hardwired circuitry may be used in place of or in combination with machine-readable instructions to implement processes described herein. Thus, implementations described herein are not limited to any specific combination of hardware circuitry and machine-readable instructions.

Although FIG. 5 shows exemplary components of device 500, in other implementations, device 500 may include fewer components, different components, differently arranged components, or additional components than depicted in FIG. 5. As an example, in some implementations, input device 540 and/or output device 550 may not be implemented by device 500. In these situations, device 500 may be a "headless" device that does not explicitly include an input or an output device. Alternatively, or additionally, one or more components of device 500 may perform one or more other tasks described as being performed by one or more other components of device 500.

FIG. 6 is a flow chart of an exemplary process for managing business device 102 according to implementations described herein. Process 600 is described with respect to tables 300 and 310 shown in FIGS. 3A, and 3B respectively, for illustrative purposes. In one implementation, process 600 may be performed by ICRM 104. In another implementation, some or all of process 600 may be performed by another device or group of devices, including or excluding ICRM 104.

As shown in FIG. 6, ICRM 104 may identify network information for a network, such as networks 120/130 (block 602). For example, ICRM 104 may receive network information including signal status, network connects and power outages. ICRM 104 may compile and compress the network information, such as network metrics 302 described with respect to FIG. 3A and table 300 above (block 604). For example, ICRM 104 may prepare the first NMVs 304 and second NMVs 306 for transmission in a particular order and/or format. ICRM 104 may include network metrics 302 in a predetermined sequence with corresponding first NMVs 304 and second NMVs 306.

At block 606, ICRM 104 may identify business device information, for example from an associated business device 102 in which ICRM 104 is integrated or to which ICRM 104 is operably connected. The business device information may include. ICRM 104 may compile and compress the business device information, such as business metrics 312 and associated first BMVs 314 and second BMVs 316, described with respect to FIG. 3B and table 310 (block 608). Additionally, ICRM 104 may encrypt the business device information. ICRM 104 may encrypt the business device information based on an encryption/decryption protocol that is shared with IMH 110. The business device information may be encrypted separately from the network information.

ICRM 104 may send compressed (and, in some instances, encrypted) information, including the business device information and/or the network information to IMH 110 (block 610). For example, ICRM 104 may connect to networks 120/130 and send a status update to IMH 110. Bandwidth may then be allocated in networks 120/130 for ICRM 104 to transmit compressed information to IMH 110. IMH 110 may receive and process the information as described with respect to process 700 and FIG. 7 below.

At block 612, ICRM 104 may determine whether a response to the compressed information has been received from IMH 110 by a predetermined response time (i.e., a time allocated for a response from IMH 110). If a response is received within the predetermined response time (block 612—Yes), ICRM 104 may determine an action based on the received response (block 614). The response may include an acknowledgement of ICRM 104. The response received from IMH 110 may also include commands based on particular information included in the network information and/or business device information. For example, the response may include a command to change settings of (or associated with) business devices 102 related to particular business metrics 312, such as decreasing a temperature of a vending machine.

If a response is not received within the predetermined response time (block 612—No), ICRM 104 may determine an action based on the absence of the received response (block 616). For example, ICRM 104 may resend the compressed information. Alternatively, ICRM 104 may continue to send compressed information for a predetermined number of scheduled predetermined status update intervals, after which ICRM 104 may automatically reset.

FIG. 7 is a flow chart of an exemplary process for managing business device 102 according to implementations described herein. In one implementation, process 700 may be performed by IMH 110. In another implementation, some or all of process 700 may be performed by another device or group of devices, including or excluding IMH 110.

As shown in FIG. 7, IMH 110 may receive compressed information (block 702). For example, IMH 110 may receive compressed information that includes network information and/or business device information from ICRM 104 and associated business device 102 in a compressed (and in some instances encrypted) format. The compressed information may include network information and business device information that has been separately compressed and/or encrypted.

IMH 110 may determine network information and/or business device information from the compressed information (block 704). For example, IMH 110 may decompress the compressed information (and decrypt, where applicable) based on a commonly held (between IMH 110 and ICRMs 104) compression key. IMH 110 may determine that particular business metrics 312 or network metrics 302 are within At block 706, IMH 110 may determine whether the network information and/or business device information requires a predetermined response. IMH 110 may identify a range of business metrics 312 that require adjustment of settings on business devices 102 or other action to initiate an appropriate action in response to detected business metrics 312.

At block 708, IMH 110 may provide a predetermined response. For example, with regard to FIG. 3B and table 310, IMH 110 may identify that change available is at a reserve level (i.e., the change available may not support more than a few additional purchases) and provide an alert to a device associated with service personnel. Alternatively, at block 710, IMH 110 may provide an acknowledgment of ICRM 104 in response to a determination that a response specific to network information and business device information is not required.

According to one embodiment, responses to the network information and the business device information may be determined by separate applications associated with IMH 110. IMH 110 may determine the predetermined response to the network information using an associated network management application. The network management application and associated/authorized personnel that support network 100 may have access to the network information. IMH 110 may send the encrypted business device information to a separate business application (running on IMH 110 or on a different host device (in some instances in a separate data center). IMH 110 may allow an administrator for network 100 to limit access to the business device information and/or the network information to different identified stakeholders, such as network management personnel and business personnel for sensitive or proprietary information (e.g., banking information, etc.).

Systems and/or methods described herein may allow cooperative management of one or more business devices in a system based on communication between networked devices associated with the business devices and a central hosting device for the system. Additionally, the systems and methods are adaptable and may be implemented in a cellular network to address data monitoring strategies of each particular business enterprise with regard to the business devices.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 6 and FIG. 7, the order of the blocks may be modified in other implementations. Further, non-dependent blocks may be performed in parallel.

It will be apparent that different aspects of the description provided above may be implemented in many different forms of machine-readable instructions, firmware, and hardware in the implementations illustrated in the figures. The actual machine-readable instructions or specialized control hardware used to implement these aspects is not limiting of the invention. Thus, the operation and behavior of these aspects were described without reference to the specific machine-readable instructions—it being understood that machine-readable instructions and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and machine-readable instructions.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A computer-implemented method comprising:
    receiving, at a communications device associated with a second device, network information for operating conditions of a network, wherein the network connects the communications device to an intelligent management host device;
    compressing, at the communications device, the network information;
    receiving, at the communications device, second device information associated with the second device;
    compressing, at the communications device, the second device information;
    sending the compressed second device information and the compressed network information from the communications device to the intelligent management host device via the network;
    determining whether a response based on information included in the compressed second device information and the compressed network information is received from the intelligent management host device within a predetermined response time at the communications device; and
    determining an action to be taken based on:
        information included in a received response, in response to a determination that the response has been received from the intelligent management host device within the predetermined response time; or
        absence of a received response, in response to a determination that the response has not been received from the intelligent management host device within the predetermined response time.

2. The computer-implemented method of claim 1, wherein the second device performs one or more primary functions related to a business purpose of a customer of a particular entity.

3. The computer-implemented method of claim 1, wherein the second device information enables administrators to monitor performance of the second device.

4. The computer-implemented method of claim 1, wherein the second device information enables administrators to determine capabilities of the second device to fulfill functions associated with a primary business purpose.

5. The computer-implemented method of claim 1, wherein the second device information comprises at least one of a power status, an associated temperature, an item inventory, a cash inventory, or a coin inventory.

6. The computer-implemented method of claim 1, wherein sending the compressed network information further comprises sending at least one of a signal strength or a network connection indicator.

7. The computer-implemented method of claim 1, wherein the second device information further comprises an event code generated in response to an event associated with the second device.

8. The computer-implemented method of claim 7, wherein the event code indicates that a change in at least one of a temperature or a humidity detected by an environmental sensor associated with the communications device exceeds a predetermined threshold.

9. The computer-implemented method of claim 7, wherein the event code indicates that a motion sensor associated with the second device has detected that the second device is being shaken.

10. The computer-implemented method of claim 7, wherein the event code indicates that power supplied to the second device has stopped and the communications device is functional.

11. The computer-implemented method of claim 1, further comprising in response to absence of the received response at least one of:
    resending the compressed second device information and the compressed network information, or
    resetting the communications device.

12. The computer-implemented method of claim 1, wherein compressing the second device information comprises:
    selecting a compression key based on a predefined range for the second device information; and
    using the compression key to compress the second device information.

13. The computer-implemented method of claim 1, wherein each of compressing the second device information and the network information comprises:
    arranging values corresponding to business metrics associated with the second device and values corresponding to network metrics associated with the network in a particular order, wherein the particular order indicates that a particular value corresponds to a particular metric.

14. The computer-implemented method of claim 1, wherein the response includes receiving an instruction to take multiple pictures by a camera proximate to the second device to be sent to the intelligent management host device in response to a motion detector associated with the second device having detected that the second device is being shaken.

15. A device, comprising:
    a memory to store a plurality of instructions; and
    a processor configured to execute instructions in the memory to:
        receive, via a network, compressed information from a communications device, the communications device associated with a second device, wherein the compressed information includes network information and second device information; and
        determine whether to provide a predetermined response in response to at least one of the network information or the second device information and:
            provide the predetermined response via the network in response to a determination to provide the predetermined response; or
            provide an acknowledgement via the network in response to a determination to not provide the predetermined response.

16. The device of claim 15, wherein the processor is further configured to execute instructions in the memory to allow an administrator for the network to limit access to at least one of the second device information or the network information to different identified personnel.

17. The device of claim 15, further comprising a central repository for a business.

18. The device of claim 15, wherein the processor is further configured to execute instructions in the memory to provide at least one of support or control of the second device via the communications device.

19. A non-transitory computer-readable medium including instructions to be executed by a processor, the instructions including one or more instructions, when executed by the processor, for causing the processor to:
- receive network information for a network at a communications device associated with a second device, wherein the network connects the communications device to an intelligent management host device;
- receive second device information associated with the second device;
- compress the second device information and the network information;
- send the compressed second device information and the network information to the intelligent management host device via the network;
- determine whether a response based on information included in the compressed second device information and the network information is received within a predetermined response time; and
- determine an action to be taken based on information included in a received response in response to a determination that the response has been received within the predetermined response time, or absence of a received response in response to a determination that the response has not been received within the predetermined response time.

20. The non-transitory computer-readable medium of claim 19, wherein, when receiving the second device information associated with the second device, the one or more instructions further causes the processor to:
- determine whether the second device information includes values for business metrics that exceed a predetermined threshold; and
- issue at least one event code in response to a determination that the second device information includes values for business metrics that exceed the predetermined threshold.

* * * * *